April 22, 1952 W. F. BERCK 2,593,527
VALVE
Filed Jan. 4, 1945 2 SHEETS—SHEET 1
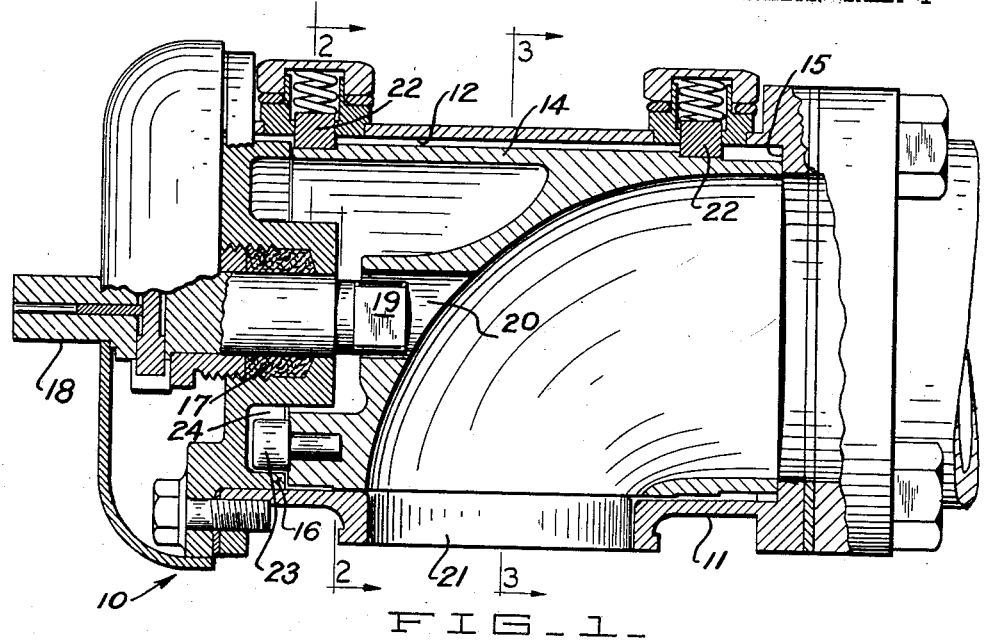
FIG_1_
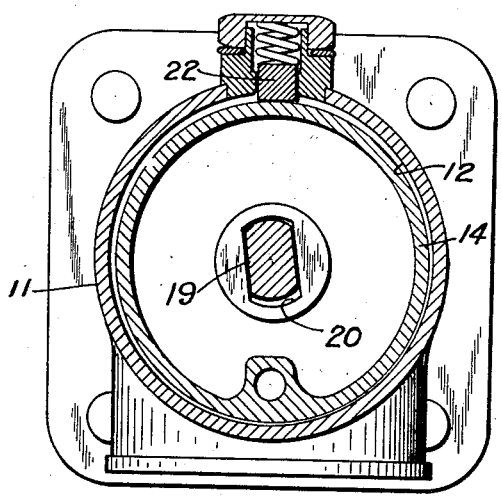
FIG_2_
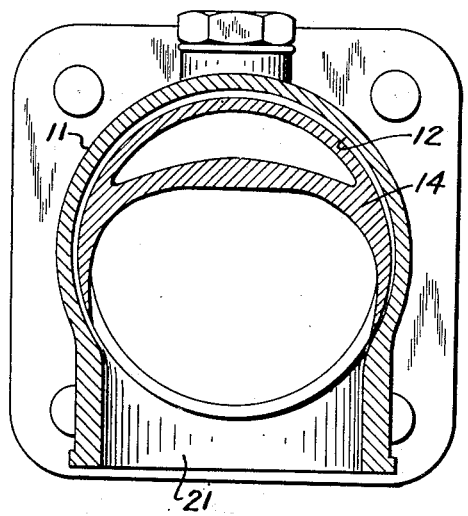
FIG_3_
INVENTOR.
WILLIAM F. BERCK
BY
Oscar A. Mellin
ATTORNEY.

April 22, 1952 W. F. BERCK 2,593,527
VALVE
Filed Jan. 4, 1945 2 SHEETS—SHEET 2
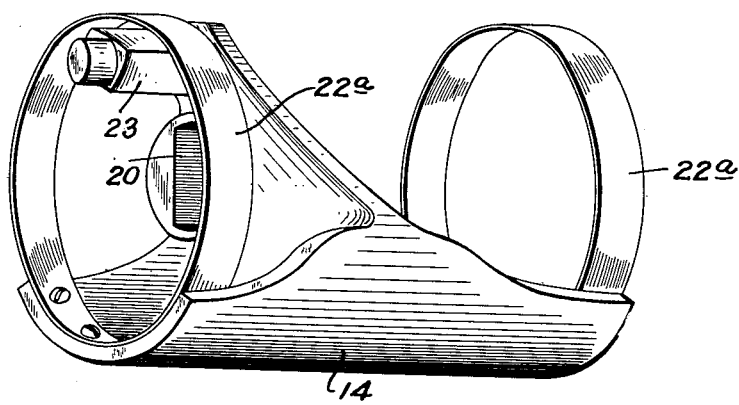
FIG_4_
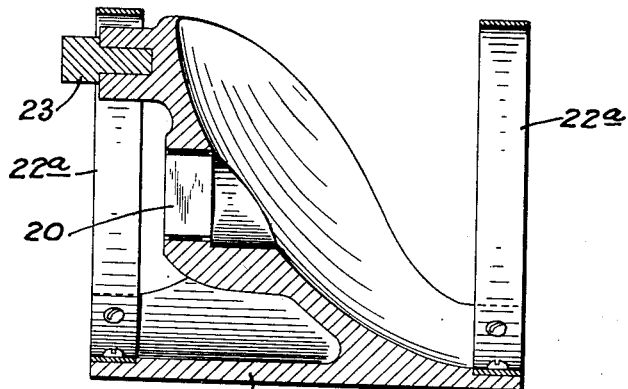
FIG_5_
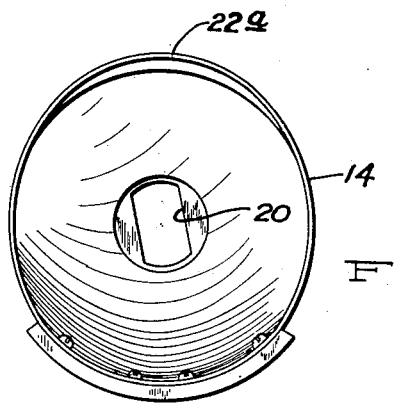
FIG_6_
INVENTOR.
WILLIAM F. BERCK
BY
Oscar A. Mellin
ATTORNEY.

Patented Apr. 22, 1952

2,593,527

UNITED STATES PATENT OFFICE 2,593,527

VALVE

William F. Berck, Oakland, Calif., assignor to Ralph N. Brodie Company, Oakland, Calif., a a corporation of California Application January 4, 1945, Serial No. 571,291

2 Claims. (Cl. 251—95)

This invention relates to valves.

It is the principal object of my present invention to provide a valve of improved simple construction which can be produced inexpensively by production methods and which will be efficient in operation.

In practicing my invention, I provide a valve housing having a straight cylindrical bore in which is fitted a cylindrical type of valve member. The connection between the valve stem and this valve member is such that the valve member is enabled to move diametrically relative to the stem when in closed position, so that the valve may be urged to tight seating condition by spring means bearing directly against the valve member.

The invention is exemplified in the following description and illustrated by way of example in the accompanying drawings, in which:

Fig. 1 is a view in longitudinal section through a valve embodying one form of my invention.

Fig. 2 is a transverse sectional view therethrough taken on line 2—2 of Fig. 1.

Fig. 3 is a transverse sectional view taken on line 3—3 of Fig. 1.

Fig. 4 is a perspective view of a slightly modified form of valve member.

Fig. 5 is a central longitudinal section through the valve member shown in Fig. 4.

Fig. 6 is an end view of the valve member shown in Fig. 4.

Referring more particularly to the accompanying drawings, 10 indicates a valve embodying my invention. This valve comprises a cylindrical valve body 11 having a straight bore 12 therein. Loosely fitting this bore is a plug type of valve member 14. The lower end of the bore 12 is shouldered as at 15 so that the valve member 14 will be held against endwise movement between such shoulder 15 and a removable head member 16 bolted or otherwise secured to the opposite end of the valve body 12. Obviously, this simple construction of the valve body 11 enables it to be produced by production methods at a relatively low cost.

The drawings show considerable clearance between the plug 14 and the bore 12, but this is merely for the purposes of illustration because actually the fit between the plug 14 and the bore 12 is a free turning fit.

Formed coaxially of the valve head member 16 is a packing gland 17 extending through which is a valve stem 18. The lower end 19 of the valve stem 18 is substantially rectangular in cross section and projects into a complementary socket 20 formed coaxially in the upper end of the valve plug or member 14. The socket 20 snugly fits two sides of the end 19 of the valve stem 18, but its dimension at right angles to those sides is greater than that of the stem end 19 so that the valve plug or member 14 may move diametrically a limited amount relative to the valve end 19. The disposition of the socket 20 and the valve end 19 of the valve stem 18 is such that this diametrical movement of the valve plug 14 may be toward the outlet opening 21 in the side valve housing when the valve is turned to closed position. The reason for this movement is that I have provided spring-pressed members 22 in the valve housing 11 which bear against the valve member 14 and constantly urge it to seating position about the perimeter of the outlet opening 21. It will be noticed that the spring members 22 are diametrically opposite the valve outlet opening 21 of the valve housing 11.

In the form of the valve member 14 shown in Figs. 4 to 6, inclusive, of the drawings I substitute circular springs 22a for the spring members 22 shown in Figs. 1 to 3, inclusive. These springs 22a are slightly elliptical in form so that when they are inserted into the bore 12 of the valve body 11, they will likewise urge the valve member in the direction of the outlet opening 21 of the valve body 11. The inlet opening of the valve body 11 is at the end of the valve body opposite the head member 16.

In the form of the valve member 14 shown in Figs. 1 to 3, inclusive, the valve member 14 is provdied with a full cylindrical skirt and with the valve passage extending inwardly and coaxially from one end and thence in a gentle curve radially through the side of the skirt at a point where it may register with the outlet opening 21 of the valve body 11.

The form of the valve member shown in Figs. 4 to 6, inclusive, is almost identical to that just described except that a portion of the cylindrical skirt surrounding the passageway through the valve member is cut-away as illustrated.

It is intended that the valve member be turned an amount slightly less than one hundred eighty degrees from full closing to full opening position, and for the purpose of limiting its turning movement I have provided a stop member 23 on the valve member 14 which engages properly positioned stops 24 in the head member 16. These stops 24 are so located that when the stop member 23 is in engagement with one thereof, the passageway through the valve member 14 is in complete register with the outlet opening 21 of the valve body 11. When the valve member is turned an amount slightly less than one hundred eighty degrees and the stop member 23 engages the other stop 24 in the valve head 16, the discharge end of the passageway through the valve member 14 will be approximately diametrically opposite the valve outlet opening 21, and the blank skirted portion of the valve member 14 will be disposed over the outlet opening 21 of the valve body 11. In this position the end 19 of the stem 18 will be disposed so that the valve member 14 can be moved diametrically of the valve body 11 coaxially of the outlet opening 21 of the body 11. Therefore, the spring members 22 or 22a will urge the valve member 14 to a tightly seated position over the opening 21 of the body 11 to prevent leakage. This enables the valve member 14 to have a free running fit with the bore 12 of the valve body 11, while still being fluid-tight in closed position.

Obviously, because of this, the valve member 14 may be easily turned in the valve body from open to closed position, because a tight fit is not required between the bore 12 and the perimeter of the valve member 14.

From the foregoing it is obvious that I have provided a very efficient valve which can be inexpensively produced by production methods and which will be easy to operate even under high pressures.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A valve member comprising a valve body having a cylindrical bore, said body having an inlet opening at one end of the bore and an outlet opening at one side of the bore intermediate the ends thereof, a rigid valve member rotatably fitting said bore, said valve member being formed to establish communication between said openings when positioned by rotation about its axis in one position and to prevent such communication when positioned by rotation about its axis to a second position, a valve stem projecting axially through the other end of said body and connected directly to said valve member for rotating the latter, the connection between said stem and said rigid valve member enabling diametrical movement of the valve member relative to the stem, and a spring ring carried by said member urging said valve member to move diametrically in said body.

2. A valve comprising a valve body having a cylindical bore, said body having an inlet opening at one end of the bore and an outlet opening at one side of the bore intermediate the ends thereof, a rigid valve member rotatably fitting said bore, said valve member being formed to establish communication between said openings when positioned by rotation about its axis in one position and to prevent such communication when positioned by rotation about its axis to a second position, stop means associated with said valve member and said rigid valve body to enable said valve body to be positioned by rotation in said positions, a valve stem projecting coaxially into said body, a socket in said valve member engaged by said stem for imparting rotation of the stem to the valve member, said socket and stem being formed to enable said valve member to move diametrically relative to said stem, and a pair of spring rings one at each end of said body urging said valve member in a direction at right angles to the axis of said bore.

WILLIAM F. BERCK.

REFERENCES CITED

The following references are of record in the file of this patent:

UNITED STATES PATENTS

| Number | Name | Date |
|---|---|---|
| 477,720 | Weber | June 28, 1892 |
| 539,631 | Morrison | May 21, 1895 |
| 1,048,635 | Allerding | Dec. 31, 1912 |
| 1,088,088 | Paul | Feb. 24, 1914 |
| 1,224,090 | Lavigne | Apr. 24, 1917 |
| 1,361,126 | Wilson | Dec. 7, 1920 |
| 1,520,367 | Pengilly | Dec. 23, 1924 |
| 1,522,353 | Whiteman | Jan. 6, 1925 |
| 1,710,176 | MacGregor | Apr. 23, 1929 |
| 1,807,856 | Miller | June 2, 1931 |
| 2,244,759 | Bogardus | June 10, 1941 |